United States Patent
Cote

[11] 3,931,862
[45] Jan. 13, 1976

[54] SKI SUSPENSION FOR FRONT OF SNOWMOBILE

[75] Inventor: Yvon Cote, Valcourt, Canada

[73] Assignee: Bombarider Limited, Valcourt, Canada

[22] Filed: Dec. 5, 1974

[21] Appl. No.: 529,832

[52] U.S. Cl. .................................. 180/5 R; 280/25
[51] Int. Cl.² ......................................... B62B 17/04
[58] Field of Search ............... 180/5 R; 280/25, 276

[56] References Cited
UNITED STATES PATENTS

| | | | |
|---|---|---|---|
| 2,358,817 | 9/1944 | Meehan | 280/25 |
| 3,525,411 | 8/1970 | Hagen | 180/5 R |
| 3,525,412 | 8/1970 | Erickson | 180/5 R |
| 3,596,726 | 8/1971 | Takada | 180/5 R |

*Primary Examiner*—Robert R. Song

[57] ABSTRACT

A suspension and steering assembly for a ski of a snowmobile includes a coil spring and shock absorbing means including a shock absorbing piston and rod connected at one end thereto. The shock absorbing means and coil spring are arranged generally parallel with each other and telescoping strut members connect the ski to the snowmobile. A first strut member has a bottom end suitable for connection with the ski and a second strut member is slidingly connected to the first strut member and adapted to telescopically receive the latter member therein. Means are provided to permit the second strut member to rotate about a longitudinal axis thereof in order to steer the ski. The shock absorbing means is disposed within the strut members and one end of the coil spring resiliently supports the first strut member in such a manner that the first strut member is biased towards a position out of the second strut member. In the preferred embodiment, the shock absorbing means and coil spring are coaxial and the rod extends along the centre axis of the coil spring. Also means are provided for preventing relative rotation between the first and second strut members and for rotatably mounting the second strut member in the body of the snowmobile. The other end of the rod and the other end of the coil spring are rigidly connected to and are supported by the second strut member.

24 Claims, 12 Drawing Figures

SKI SUSPENSION FOR FRONT OF SNOWMOBILE

FIELD OF THE INVENTION

The present invention relates to a combined suspension and steering assembly for a ski of a snowmobile, particularly a snowmobile having two skis mounted in the nose portion of the vehicle.

DESCRIPTION OF THE PRIOR ART

Up until the present invention, most snowmobiles have employed a leaf spring suspension assembly for the two front skis which are used to steer the machine. Such suspension systems suffer from a number of disadvantages, in particular a limited spring travel of from 3 to 4 inches. Also, a certain amount of undesirable steering play is present in this setup. Sometimes, a shock absorber is also mounted on each ski to help dampen the spring action. This shock absorber is usually mounted at around 15° to the horizontal, either over or alongside the leaf spring. In this position, the shock absorber cannot dampen the spring movements very effectively: in fact, a spring travel or 3 to 4 inches gives rise to a shock absorber travel of 2 inches at the most.

Presently used front suspensions also tend to give a rather hard and uncomfortable ride and have other undesirable characteristics. The harder the ride is, of course, the greater is the tendency of the rider to become fatigued, particularly on longer trips.

The present invention provides a greatly improved suspension and steering assembly for the front skis of a snowmobile which substantially overcomes the above-mentioned problems with previously used suspension and steering systems.

SUMMARY OF THE INVENTION

According to the present invention there is provided a suspension and steering assembly for a snowmobile ski, said assembly comprising telescoping strut members for connecting said ski to said body, said strut members including a first strut member having a bottom end suitable for connection with said ski and a second strut member slidingly connected to said first strut member and adapted to telescopically receive the latter member, means for preventing relative rotation between said first and second strut member, means for rotatably mounting said second strut member in a snowmobile, a coil spring, and shock absorbing means disposed within said strut members wherein one end of said coil spring resiliently engages said first strut member in such a manner that said first strut member is biased towards a position out of said second strut member. When mounted in the front of the snowmobile, the coil spring and shock absorber are in a generally upright position. Valuable space is saved by locating the shock absorber within the strut member.

The spring and shock absorber arrangement easily permits a suspension travel of six inches or more and this gives rise to a smooth ride. This travel can also be increased or decreased quite easily if necessary. The shock absorber is in a much better position (as compared to the old arrangement with the leaf springs) to function efficiently and it can provide excellent damping characteristics for a given spring/vehicle combination. For example, four inches of travel in the bottom strut member will result in four inches of travel in the shock absorber. Also steering play is reduced or eliminated and significant weight reductions can be achieved. With one particular snowmobile, the weight of the front suspension was reduced to 33 pounds from a previous 45 pounds. A significant reduction, up to 50% or more, in the number of front suspension components is also possible with the present apparatus. Assembly and disassembly of the suspension assembly is also made easier because only three nuts need be removed to dismantle a preferred embodiment of the present assembly. A smoother ride is provided partially due to the fact that the present arrangement permits the use of a lower spring or suspension rate.

In a preferred embodiment of the present invention, a compact suspension and steering apparatus is provided which avoids the need for the previously used support struts that take up much needed space in the nose of the vehicle. Because the steering arm attached to one of the strut members remains stationary in the direction of the longitudinal axis of the strut members, the direction of the ski is not affected by any up or down movement in the suspension apparatus. If the steering arm were arranged so as to move up and down with the strut members the steering arm would have the undesirable effect of rotating the ski a small amount every time it is moved up or down, because the tie rod connected to the end of the steering arm has a fixed length. Also with this latter arrangement more space must be provided in the front of the vehicle for the tie rods.

Because there is no direct connection between the non-sliding steering arm and the sliding strut member of the present invention, the steering mechanism does not become as worn or as loose with use as it would if there was such a direct connection.

In a preferred embodiment, the shock absorbing means and coil spring are co-axial and means are provided for rotatably mounting the second strut member in the body of the snowmobile.

BRIEF DESCRIPTION OF THE DRAWINGS

Other advantages and features of the present invention will become evident from the following detailed description of a preferred embodiment and from the accompanying drawings wherein.

DESCRIPTION OF THE PREFERRED EMBODIMENTS

Figure 1:
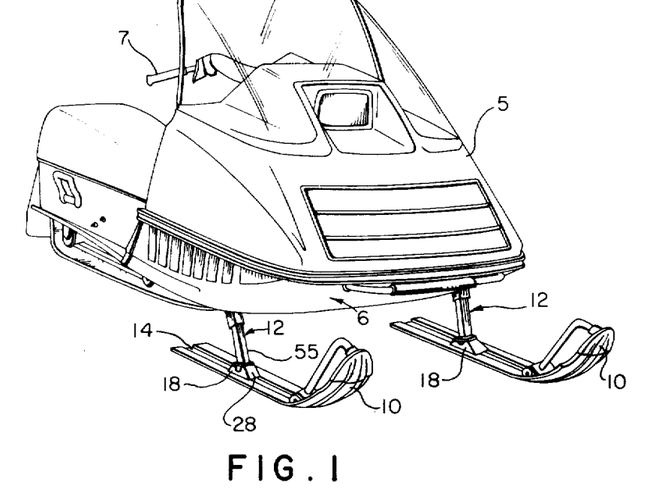
FIG. 1 is a perspective view of a snowmobile fitted with two suspension and steering assemblies of the present invention.

As can be seen from FIG. 1, a snowmobile 5 normally has two skis 10 mounted in the front or nose portion 6 of the vehicle. The two skis 10 are used to support the front portion of the vehicle and to steer the snowmobile by means of the handlebars 7 which can be manoeuvred by the operator of the vehicle. Each ski 10 is connected to the nose portion 6 by means of a combined suspension and steering assembly generally indicated at 12.

Figure 2:
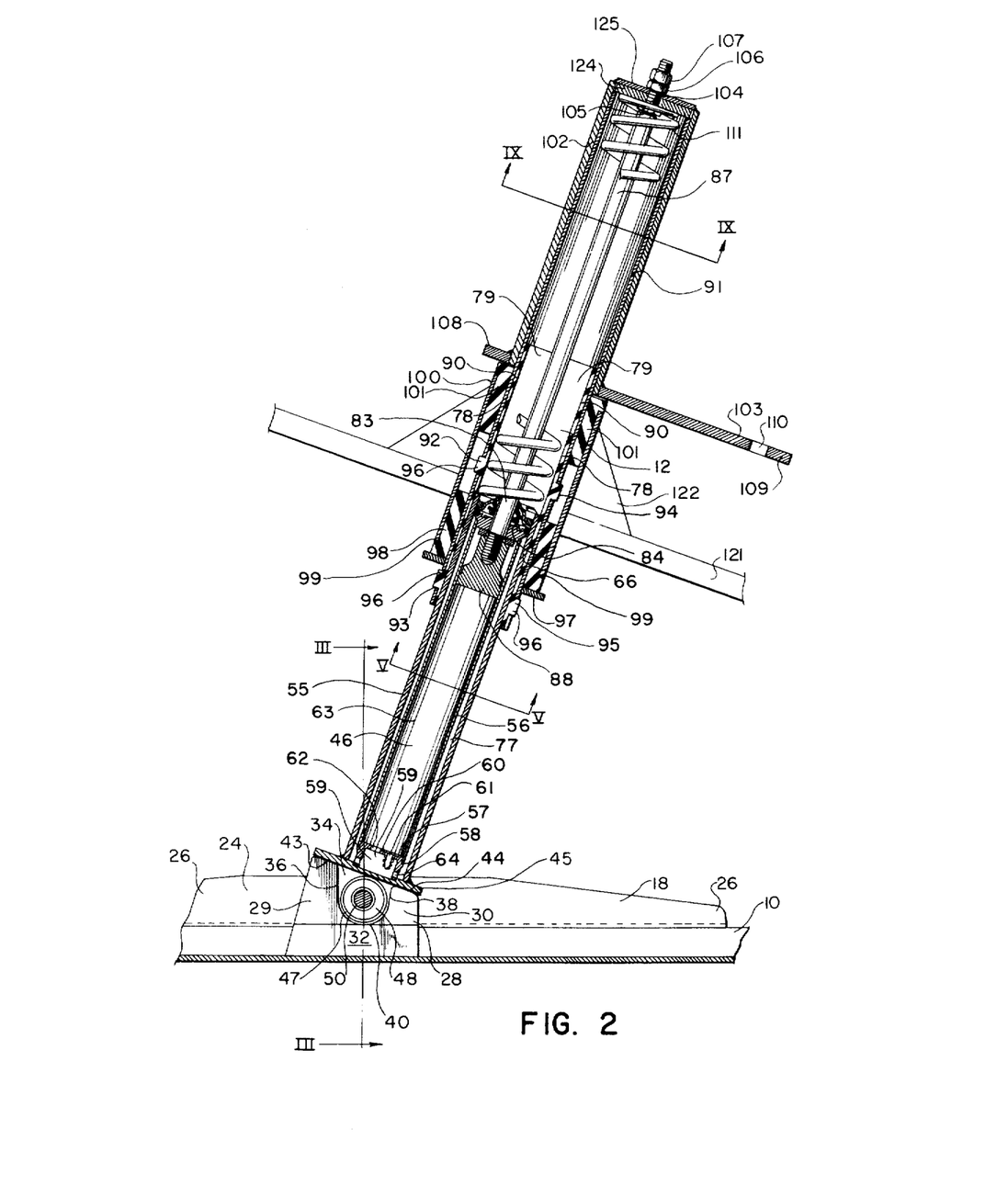
FIG. 2 (on second sheet of drawings) is a sectional elevation along the center axis of one of the two assemblies of FIG. 1 showing a portion of the ski and details of the combined suspension and steering apparatus.
Figure 3:
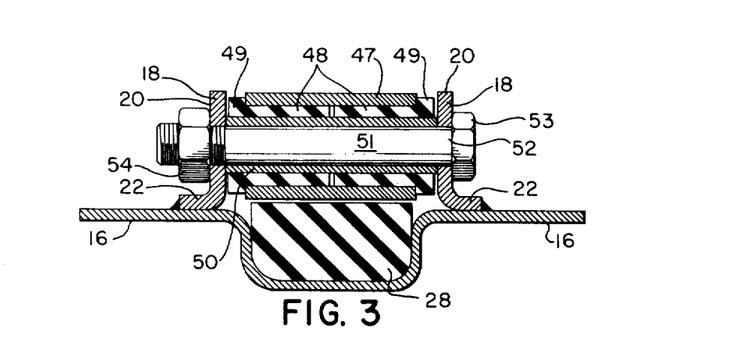
FIG. 3 is a sectional elevation taken along the line III—III of FIG. 2.

Turning now to FIG. 2, only the center portion of the ski 10 is shown along with means for connecting the ski to the bottom end of the assembly 12 (see FIG. 3). The ski is formed with a central U-shaped recess 14 running the length of the ski. The width of this recess is approximately equal to the width of each edge surface 16 extending outwardly from the top edge of both sides of the recess. The depth of the recess is approximately one-half of its width.

In a central region of the ski 10, there are two, spaced apart angle members 18, each welded or fastened in some other suitable manner to one of the edge surfaces 16. Each angle member 18 has an upwardly projecting leg 20 and an outwardly projecting leg 22. The upwardly projecting leg 20 may vary in height along its length as shown in FIG. 2, the central region 24 of the leg being higher than the two end regions 26.

Figure 4:
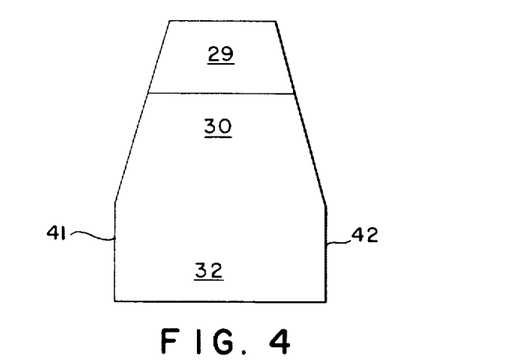
FIG. 4 is a rear elevation of a rubber block which forms the joint between the ski and the steering and suspension assembly.

The two angle members 18 may be considerably shortened in length if desired so that they are the size shown in FIG. 1. In the latter case, the members 18 are just large enough to support the two sides of a U-shaped rubber block 28 shown in detail in FIGS. 2 and 4.

The block 28 is positioned in the recess 14 of the ski between the angle members 18 of FIG. 2 and midway along their lengths. The block 28 is U-shaped when viewed from the side (as seen in FIG. 2), having two upwardly projecting supporting legs 29 and 30 and a connecting base portion 32. Leg 29 is at the front of the block and is higher than leg 30 which is at the rear of the block. The front surface of the block 28 is steeply inclined while the rear surface is vertical. The legs 29 and 30 and base portion 32 form a recess 34 which extends transversely across the centre of the top of the block 28. This recess 34 has a vertical front wall 36 and a semi-cylindrical bottom surface 40. The bottom portions of the left and right sides 41 and 42 (see FIG. 4) are vertical but the upper portions are steeply inclined. The top surfaces 43 and 44 of the legs 29 and 30 respectively slope rearwardly and are located in the same plane.

A base plate 45 of generally rectangular shape forms the bottom of the first strut member 55. Extending transversely across the bottom of the base plate 45 and welded thereto is an open-ended cylinder 47 having a length which permits the cylinder to fit easily between the legs 20 of the angle members 18 with a small clearance at each end of the cylinder 45 as can be seen from FIG. 3. The outer diameter of the cylinder is equal to the diameter of the bottom surface 40 of recess 34 and is such that the base plate 45 rests on the top surfaces 43 and 44 when the cylinder rests in the recess 34.

Located immediately within and adjacent to cylinder 47, there are two nylon bushings 48 having end portions 49 which extend beyond each end of cylinder 47. Each end portion 49 has a radially outwardly projecting lip which projects at least partially over the adjacent end of the cylinder 47. Each bushing 48 extends from one end of the cylinder 47 to approximately the centre of cylinder 47. There is a small gap between each end portion 49 and the leg 20 of the adjacent angle member.

Located immediately within and adjacent to the bushings 48 is a bearing sleeve 50 which can be constructed from suitable metal tubing. This sleeve 50 fits snuggly between the inner surface of the two legs 20 and its bore 51 extends between two aligned holes 52, each hole 52 being formed in one of the legs 20.

The bearing assembly is fastened to the angle members 18 by means of a threaded bolt 53 and nut 54. The bolt 53 is inserted through one of the holes 52 and then through bore 51 in cylinder 50 and finally through the other hole 52. The nut 54 is then threaded tightly onto the threaded end of the bolt.

The suspension and steering assembly includes two telescoping strut members for connecting the ski 10 to the body of the snowmobile 5, i.e. the nose portion 6. These strut members comprise the first strut member 55, whose bottom end includes the base plate 45 and the cylinder 47 already described and is connected with the ski 10, and a second strut member 91 which is slidingly connected to the first strut member 55 and telescopically receives the latter member. The first strut member 55 consists of a square tube, the bottom end of which is welded to the top of the base plate 45, as shown in FIGS. 1 and 2, so that two of its sides 77, which are located opposite each other, are parallel to the length of the ski 10. Alternatively, the strut member 55 can be welded so that one of its cross-sectional diagonals is parallel to the length of the ski if this is desired.

A feature of the present assembly is the shock absorbing means which include a shock absorbing piston 88 and a rod 87 connected at one end to the piston. The piston 88 and rod 87 act in cooperation with a shock absorbing chamber 63 formed by a cylindrical tube 56, the piston 88 being mounted for longitudinal sliding movement within this tube 56. The tube 56 is rigidly mounted in the first strut member 55 and fits snuggly in the square passageway extending through member 55. The bottom end of tube 56 fits on a circular platform 57, the top of which has a diameter equal to the inner diameter of circular tube 56. An annular shoulder 58 extends about the circumference of platform 57 at a point approximately midway between the bottom and top of the platform. The outer diameter of this shoulder is equal to the outer diameter of the tube 56 whose bottom end rests on this shoulder. The platform forms a cylindrical cavity 59 between the top end 60 of the platform and the base plate 45. The platform has a valve 61 fitted in its top end 60 and an opening 62 extending from the shock absorbing chamber 63 in tube 56 to the cavity 59. As shown, the valve 61 is a lightly spring loaded check valve which can be unseated to permit fluid flow from the cavity 59 into the tube 56. A second check valve (not shown) including a small bleed port, is provided in opening 62. The platform 57 sits in a shallow recess which is machined in base plate 45 and serves to locate said platform within first strut member 55. Orifices 64 put cylindrical cavity 59 in communication with the space between circular tube 56 and the square first strut member 55.

Figure 6:
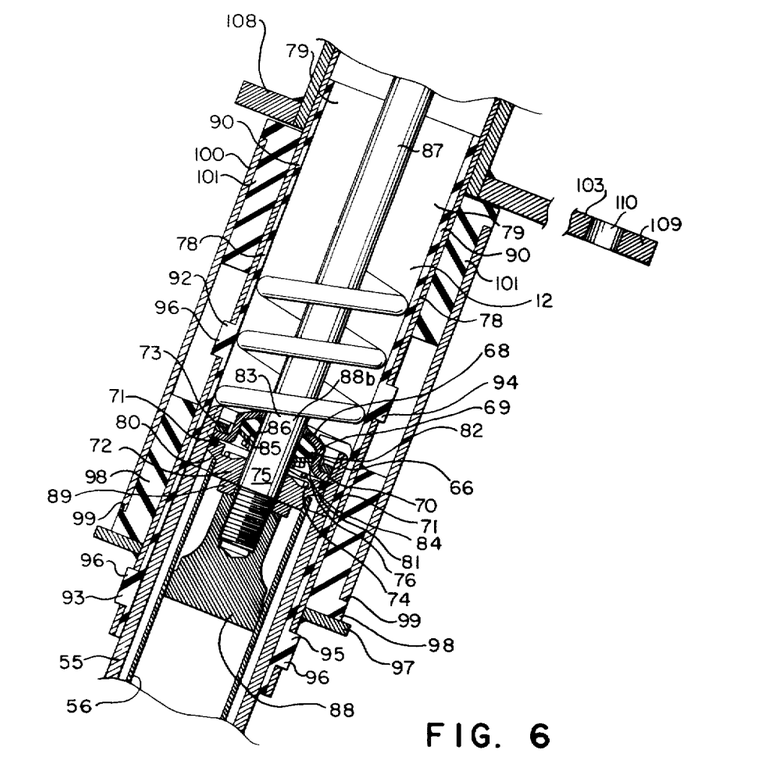
FIG. 6 is another sectional view, similar to FIG. 2, of the center portion of the suspension and steering assembly, but on an enlarged scale.
Figure 7:
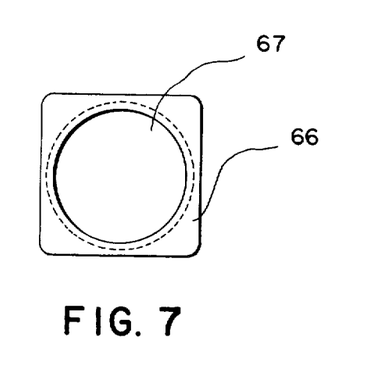
FIG. 7 is a top view of an end member which forms the top end of the first strut member.

Referring to FIG. 6 of the drawings, positioned at the upper end of the first strut member 55 is a square end member 66 having outer dimensions corresponding to those of member 55. End member 66 is shown by itself in FIG. 7 wherein the top side of the member can be seen. The outer corners of member 66 are preferably rounded and the same applies to the outer corners of strut member 55. As can be seen from FIG. 6, member 66 forms an extension of the strut member and is welded thereto. The end member 66 has a large circular bore 67 extending from top to bottom, having a diameter equal to the internal dimensions of the member 55. Fitted tightly in bore 67 there is a circular cap 68 having an upwardly protruding bulge 69 in the center thereof and a flat annular rim 70 surrounding the bulge. The outer edge of the rim 70 rests on an annular seal 71 which in turn rests on a first spring seat 72. The upper half of the bore 67 is threaded to receive a threaded ring 73 which engages the top surface of rim 70. The ring 73 thus prevents the cap 68 from being displaced upwardly with respect to member 66.

Spring seat 72 is circular and fits snuggly in bore 67. The upper surface of seat 72 is recessed to form a circular recess 74 which surrounds a cylindrical bore 75 extending through the centre of spring seat 72 from top to bottom. The outer portion of the bottom of recess 74 is flat and receives the bottom end of a coil spring 76 while the inner portion surrounding bore 75 slopes radially upwardly towards the bore. The bottom half of seat 72 is cylindrical and has a diameter which is equal to the corner diameter of tube 56.

The bottom half of seat 72 projects into the upper end of chamber 63 of tube 56 a short distance so that the extreme upper end of the tube 56 meets a downward facing annular shoulder 80 formed between the bottom and upper halves of seat 72. Also the spring seat 72 has an annular recess 81 extending around the outer edge of the top of the seat to receive the seal 71.

A seal 82 having the shape of a ring and a trapezoidal cross-section extends around the inner circumference of the bulge 69 in the cap 68. The bulge 69 has a circular hole 83 in its centre. Below the seal 82 is a second spring seat 84 which has a cylindrical lower portion 85 and an upwardly and radially outwardly extending annular rim 86 at the top edge of the cylindrical portion. The upper surface of annular ring 86 lies adjacent the bottom of seal 82. The hole in the cap 68, seal 82, and spring seats 84 and 72 are arranged to form a cylindrical passageway 88b for the rod 87. The spring 76 which is narrower at its top than at its bottom extends between spring seats 72 and 84.

The piston 88 sliding in the tube 56 is connected to the bottom end of the rod 87 and has a relatively broad base portion which fits snuggly in chamber 63, and a narrower, longer upper portion which is internally threaded to receive a threaded end portion of the rod 87. A washer 89 surrounds the rod 87 and sits on the top surface of the piston 88. Although not shown in the drawings, the piston 88 includes the usual fluid flow ports to permit hydraulic fluid to flow at controlled rates from one side of the piston to the other and vice versa, in response to movements of the piston in the tube 56.

To avoid sliding contact between the metal surfaces of the first strut member 55 and the second strut member 91, non-metallic slide means or bushings 90 are interposed between these members. The slide means 90 permit the first strut member 55 to slide easily and without undue wear into and out of the second strut member 91. The slide means 90 are preferably constructed of nylon and can take the form of two elongated slide members, each having a U-shaped cross-section and rigidly connected to the inner surfaces of a bottom portion of the second strut member 91. The second strut member 91 consists of a square metal tube having two holes 92 and 93 drilled in its front side and two holes 94 and 95 drilled in its rear side. Holes 92 and 94 are directly opposite from one another, (as are holes 93 and 95) and are located approximately midway along the length of the slide members 90. The holes 93 and 95 are located near the bottom of strut member 91. Each slide member 90 is fitted with short, circular protuberances having a diameter equal to that of holes 92 to 95 and projecting outwardly through these holes to hold the slide members firmly in place.

Figure 5:
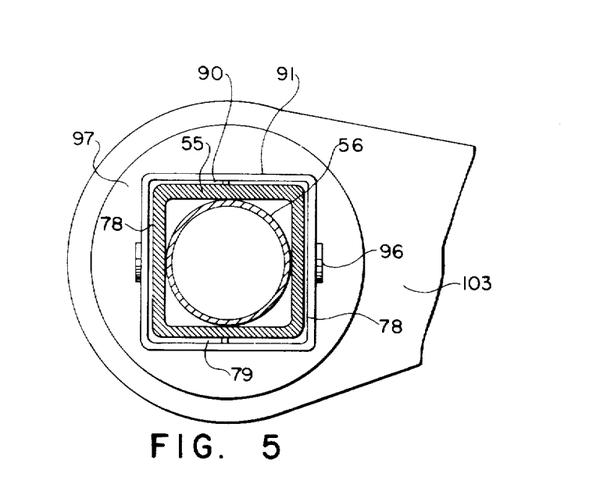
FIG. 5 is a section taken along the line V—V of FIG. 2 and showing the cross-section of the first strut member.

As can be seen in FIG. 5 of the drawings, each slide member has a base portion 78 and two leg portions 79 projecting from either edge of the base portion 78. The leg portions are half the width of the base portion so that, when the two slide members are placed together with the leg portions of each extending towards and meeting the respective leg portions of the other, an unobstructed square passageway for the first strut member 55 is formed.

Figure 8:
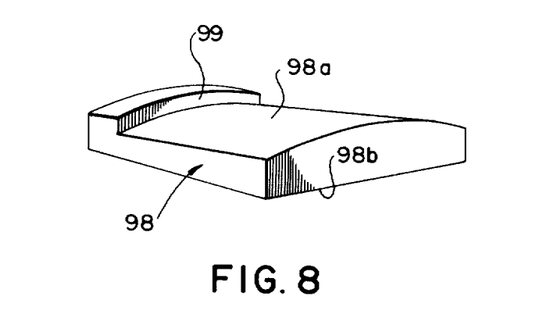
FIG. 8 is a perspective view of a nylon block used to mount the second strut member in the nose portion of the snowmobile.
Figure 9:
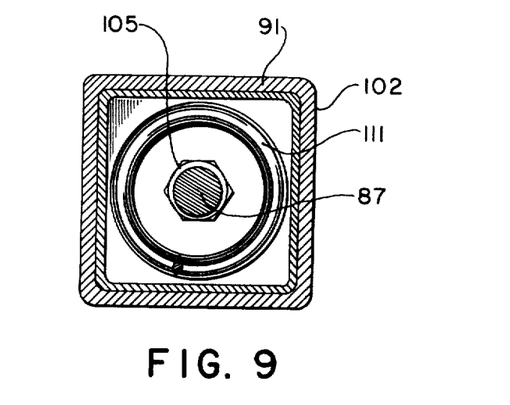
FIG. 9 is a sectional view taken along the line IX—IX of FIG. 2 and showing the cross-section of the second strut member.

Immediately above holes 93 and 95, a flat ring 97 is welded to the second strut member 91. Resting on the upper surface of this ring are four identical nylon blocks 98, only two of which are shown in FIG. 2. One block 98 is placed adjacent each side of the strut member 91. Each block 98 (see FIG. 8) has a curved outer surface 98a forming a portion of a cylindrical surface and a flat rectangular inner surface 98b adjacent the strut member 91. The bottom end of the outer surface of each block projects outwardly a short distance to form a flat outwardly facing shoulder 99.

A cylindrical metal tube, 100, is rigidly mounted to the nose portion 6, of the snowmobile receives strut member 91. The four blocks, 98, have a radius of curvature on their outer surface 98a corresponding to the inner diameter of tube 100; their opposite face, 98b, which is flat, bears against second strut member 91. Four blocks 101 which are identical to blocks 98 are inserted between the upper portion of tube 100 and the four sides of second strut member 91, so that said second strut member is adequately supported at longitudinally spaced locations. The right blocks, 98, 101, create a bearing or wear surface between second strut member 91 and tube 100 and permit second strut member 91 to rotate in tube 100.

FIG. 2 illustrates one possible arrangement for mounting the tube 100. A center portion of the tube 100 is connected to a rigid plate or frame 121 in the nose portion so that the tube or sleeve 100 is held at a slight angle to the vertical. Braces 122 in the form of triangular plates are welded to the outside of tube 100 and to the top of the frame for additional strength. The blocks 98 and 101 and tube 100 thus form an assembly which permits rotation of the second strut member 91 in order to steer the snowmobile.

An end plate, 124, welded to the top of second strut member 91 rigidly supports the top end of the coil spring means 111 and the top end of the rod 87. The portion of second strut member 91 which projects above tube 100 is covered with a closely fitting square tube member 102, said square tube member having its upper end closed by end plate 125. A cylindrical opening, 104, extends through the center of end plate 124 and end plate 125. The upper end of rod 87 is threaded and is received in cylindrical opening 104. Nut 105, nut 106 and jam nut 107 secure rod 87 to end plate 124 and to end plate 125; in this way, said nuts and said jam nut also secure second strut member 91 and square tube member 102 together. A steering arm or linkage 103 is rigidly connected to and extends transversely from the tube member 102 at the bottom end thereof. Also, tube member 102, by bearing against blocks 101 prevents second strut member 91 from sliding out of tube 100 and falling off the snowmobile.

Figure 10:
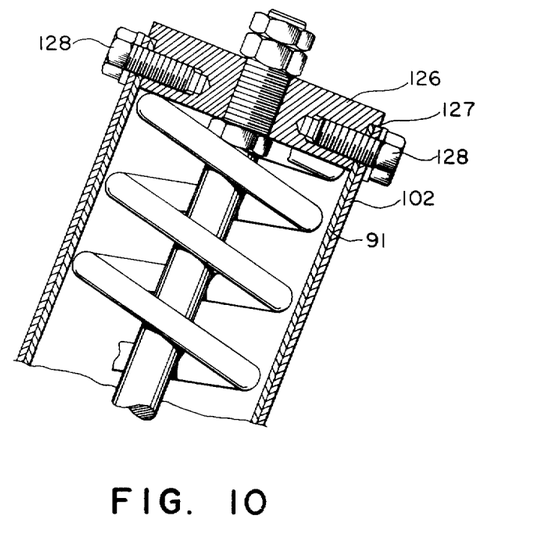
FIG. 10 is a sectional view showing an alternative form of the upper end of the assembly shown in FIG. 2.

In the modified embodiment of FIG. 10, both strut member 91 and tube member 102 are closed at their top end with the same end plate member 126. End plate 126 is formed with a downwardly facing shoulder 127 which engages the upper edges of member 91 and 102. Holes are drilled in the sides of end plate 126 and these holes are threaded to receive the studs 128. The studs 128 on the sides of the end plate 126 can be used to rigidly connect the plate 126 to the upper ends of members 91 and 102. These studs 128 are inserted through holes formed near the top end of the members 91 and 102 and in line with the holes formed in the end plate. The upper end of the rod 87 is connected to the end plate 126 in the same manner as that already described in connection with the embodiment of FIG. 2.

The steering arm or linkage 103 is constructed from a flat metal plate and is made with a large rounded end 108 with a square opening therein into which the bottom end of tube member 102 is inserted for welding. The sides of the linkage converge from this large rounded end to a small rounded end 109 through which extends a small cylindrical hole 110. The linkage 103 is connected to a steering mechanism (not shown) by means of the hole 110.

The coil spring means 111 consists of a relatively large coil spring which extends from the top end of the first strut member 55 to the top end of the strut member 91 and has a diameter equal to the external dimensions of member 55. The coil spring urges the first strut member 55 downwardly so that the shock absorbing piston 88 is normally at or near the top of the shock absorbing chamber 63. When the snowmobile hits a bump however, the spring 111 contracts to cushion the impact as the first strut member is forced upwards. This upward movement of member 55 causes the piston 88 to move downwardly relative to the chamber 63, further cushioning the ride. The shock absorbing means 46 then acts to dampen the spring action.

To reduce the weight of the suspension and steering apparatus, at least the steering linkage 103 and the square tube member 102 may be constructed of aluminum or aluminum alloy.

Figure 11:
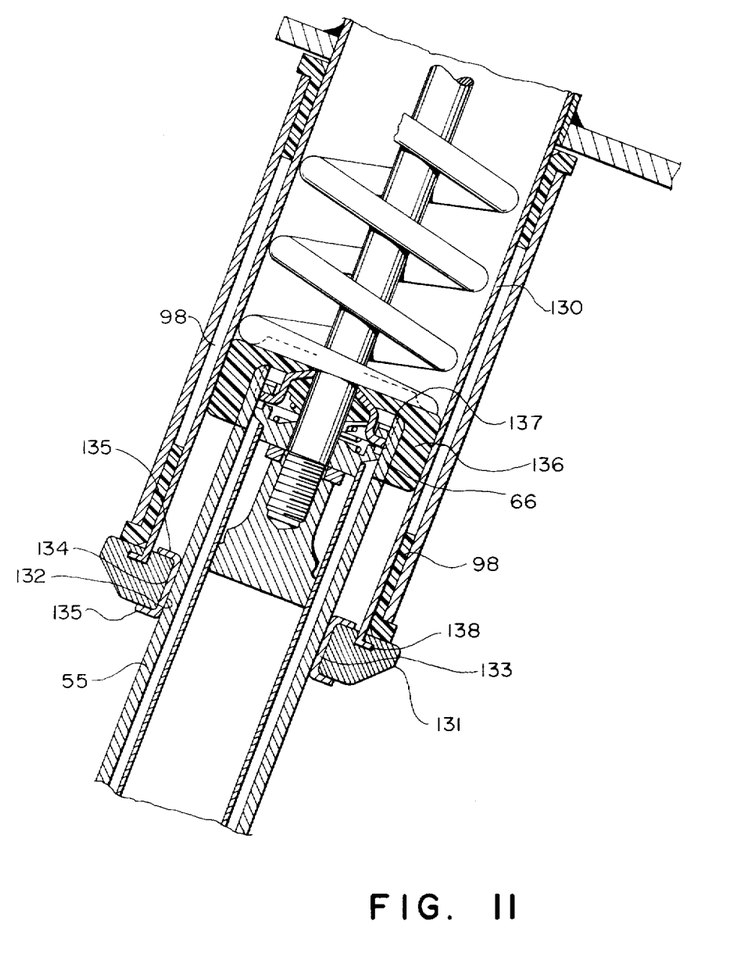
FIG. 11 is a view similar to FIG. 6 showing an alternative embodiment of the second strut member and the means of mounting the upper end of the first strut member therein.
Figure 12:
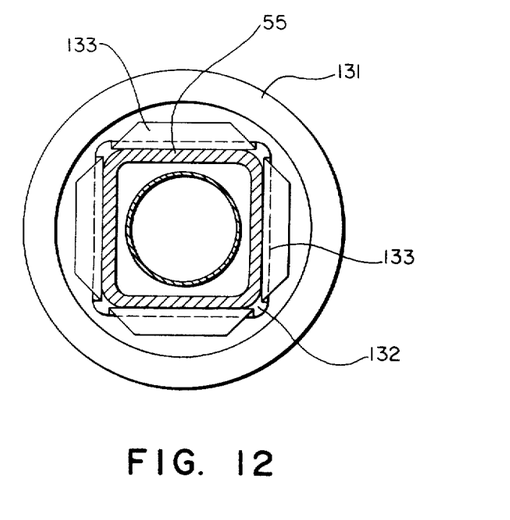
FIG. 12 is a sectional view taken along the line XII—XII of FIG. 11.

An alternative construction of the second strut member and the means for supporting the upper end of the first strut member in the second strut member is illustrated in FIGS. 11 and 12 of the drawings. In this embodiment, the second strut member consists of a round metal tube 130. Rigidly connected to the bottom end of this tube 130 is a first strut guide 131 which is generally ring-shaped as can be seen from FIG. 12. A square hole 132 is formed in the center of the guide 131 and extends completely through this guide in order to receive the square first strut member 55. Clamped to each side of the hole 132 is a brass slider 133 which is U-shaped in cross-section (see FIG. 11). The base portion 134 of each slider extends from the bottom to the top of its respective side of the hole 132 while one of the outwardly extending arms 135 of the slider 133 extends a short distance along the bottom of the guide 131. The other arm 135 of this slider extends along the top surface of the guide 131 inside of the bottom end of tube 130.

The end member 66 at the upper end of strut member 55 in this second embodiment is encased in a cylindrical nylon guide 136 which helps to guide the upper end of the first strut member as it moves up and down in the tube 130. The nylon guide 136 snuggly engages the interior surface of the tube 130 and has a center hole formed therein to receive the end member 66. The hole formed in the guide 136 extends completely through the guide so as to permit the rod 87 to extend through it. The hole in the guide 136 is formed with a downwardly facing shoulder 137 which engages the top of the end member 66. The top surface of the guide 136 is formed to receive the bottom end of the large coil spring which rests against this surface. This embodiment thus avoids the need for the slide means 90 described in connection with the first embodiment shown in FIG. 6.

The top surface of the strut guide 131 is be formed with an annular recess 138 into which the bottom end of the tube 130 is welded. Since the tube 130 forming the second strut member is cylindrical, the tube member 102 at the top thereof will also have a cylindrical configuration. In this embodiment, relative rotation between the first and second strut members is prevented by the strut guide 131 rigidly connected to the bottom end of the second strut member.

Various other cross-sectional configurations of the first and second strut members are of course possible. For example, the first strut member 55 can have a triangular cross-section instead of a rectangular cross-section. In this case, the second strut member 91 and the tube member 102 will also have a triangular cross-section but the assembly would otherwise be constructed in generally the same manner as that already described in connection with the embodiment shown in FIG. 2. Another possible alternative is to form the first strut member 55 with a generally circular cross-section except that one side of the member would be flattened. This flat side would extend from the top to the bottom of the strut member. Also, in this case, the second strut member 91 and the tube member 102 would be formed with a generally circular cross-section and would be flattened on one side. The flattened side of the first strut member would then co-operate with the flattened side of the second strut member to prevent relative rotation between the strut members.

A further alternative to the first and second strut members of FIG. 2 consists of a first strut member 55 having a circular cross-section. Longitudinally extending splines can be formed on the exterior surface of the first strut member, these splines extending from the top to the bottom of the strut member and being distributed about the circumference of the member. There might for example be four splines, each located at an angle of 90° from an adjacent spline on the strut member. These splines would engage co-operating recesses formed in the interior surface of the second strut member 91. The second strut member in this embodiment can be formed with a square exterior cross-section and a cylindrical hole extending from the top to the bottom of the strut member. The recess for each spline of the first strut member can be formed in the interior surfaces of this cylindrical hole at each of the four corners of the second strut member. Because of the engagement between the splines of the first strut member and the recesses in the second strut member, relative rotation between the strut members would of course be prevented.

What I claim as my invention is:

1. A suspension and steering assembly for a snowmobile ski, said assembly comprising telescoping strut members for connecting said ski to said body, said strut members including a first strut member having a bottom end suitable for connection with said ski and a second strut member slidingly connected to said first strut member and adapted to telescopically receive the latter member, means for preventing relative rotation between said first and second strut member, means for rotatably mounting said second strut member in a snowmobile, a coil spring, and shock absorbing means disposed within said strut members wherein one end of said coil spring resiliently engages said first strut member in such a manner that said first strut member is biased towards a position out of said second strut member.

2. A suspension and steering assembly according to claim 1 including means for rotating said second strut member, said rotating means including a steering arm rigidly connected to said second strut member.

3. A suspension and steering assembly according to claim 1 wherein said means for preventing relative rotation between said first and second strut members are provided by forming each of said first and second strut members with co-operating flat sides extending the length of said strut members.

4. A suspension and steering assembly according to claim 3 wherein said first and second strut members are both rectangular in cross-section.

5. A suspension and steering assembly according to claim 1 wherein said second strut member supports the other end of said coil spring and one end of a rod, which is part of said shock absorbing means, said second strut member comprising a tube member having a closed top end.

6. A suspension and steering assembly according to claim 5 wherein a steering arm is rigidly connected to and extends transversely from said tube member.

7. A suspension and steering assembly according to claim 6 wherein said tube member has at least one flat side extending the length of said tube member.

8. A suspension and steering assembly according to claim 1 wherein said shock absorbing means includes a shock absorber tube rigidly mounted in said first strut member, the interior of said shock absorber tube defining a shock absorbing chamber, and a piston mounted for sliding movement along the length of said shock absorber tube and comprising a main valve.

9. A suspension and steering assembly according to claim 1 wherein said first and second strut members are metallic, and low friction nonmetallic slide means are interposed between said first and second strut members to permit said first strut member to slide easily and without undue wear into and out of said second member.

10. A suspension and steering assembly according to claim 9 wherein said slide means are comprised of nylon.

11. A suspension and steering assembly according to claim 9 wherein said slide means comprise two elongated members each having a U-shaped cross-section and rigidly connected to the inner surfaces of a bottom portion of said second strut member.

12. A suspension and steering assembly according to claim 1, wherein said coil spring is completely enclosed in said second strut member.

13. A suspension and steering assembly according to claim 4 wherein said shock absorbing means include a shock absorber tube rigidly mounted in said first strut member, the interior of said shock absorber tube defining a shock absorbing chamber, and a piston mounted for sliding movement along the length of said shock absorber tube and comprising a main valve.

14. A suspension and steering assembly according to claim 13 wherein said first strut member is square in cross-section and said coil spring has an external diameter equal to the width of said first strut member.

15. A suspension and steering assembly according to claim 14 wherein said piston is mounted to one end of a rod and said second strut member encloses said coil spring and said rod.

16. A suspension and steering assembly according to claim 1, wherein said bottom end of said first strut member includes a plate support member extending perpendicularly to the length of said first strut member and a cylindrical tube member with one side connected to the bottom of said plate support member.

17. A suspension and steering assembly for a snowmobile ski comprising telescoping strut members for connecting said ski to a snowmobile, said strut members including a first strut member and a second strut member slidingly connected to said first strut member and adapted to receive said latter member non-rotatably and telescopically therein, means constraining said strut members to rotate together about a common longitudinal axis thereof in order to steer said ski, a coil spring, shock absorbing means disposed within said strut members wherein one end of said coil spring resiliently engages said first strut member in such a manner that said first strut member is biased towards a position out of said second strut member.

18. A snowmobile having a body with a nose portion, two front skis for supporting said nose portion and steering said snowmobile, and a suspension and steering assembly according to claim 1, for each front ski, the bottom end of said first strut member of each assembly being connected to its respective ski and each assembly being rotatably mounted in said nose portion.

19. A suspension and steering assembly according to claim 17 wherein said shock absorbing means and coil spring are co-axial and said shock absorbing means includes a piston and a rod extending along the centre axis of said coil spring.

20. A suspension and steering assembly according to claim 1 wherein said means for preventing relative rotation between said first and second strut members are provided by flat sides extending the length of the first strut member and by a strut guide rigidly attached to the bottom end of said second strut member and having flat sides which co-operate with the flat sides of said first strut member to prevent relative rotation.

21. A suspension and steering assembly according to claim 20 wherein said first strut member is rectangular in cross-section and said strut guide has a rectangular hole formed therein.

22. A suspension and steering assembly according to claim 17 wherein said shock absorbing means includes a shock absorbing piston and rod connected at one end thereto and is arranged generally parallel with said coil spring.

23. A suspension and steering assembly according to claim 1 wherein said shock absorbing means comprises a shock absorbing chamber, a piston and a rod connected at one end to said piston and said shock absorbing chamber is coaxial with said rod which extends generally along the centre axis of said coil spring.

24. A suspension and steering assembly according to claim 22 wherein said second strut member supports the other end of said coil spring and other end of said rod in said snowmobile which are rigidly connected to said second strut member.

* * * * *